United States Patent
Collins et al.

(10) Patent No.: US 6,701,903 B1
(45) Date of Patent: Mar. 9, 2004

(54) METHOD OF DETERMINING VALVE EVENTS TO OPTIMIZE ENGINE OPERATING PARAMETERS

(75) Inventors: Brett Denton Collins, Tucson, AZ (US); Lawrence Andrew Mianzo, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 37 days.

(21) Appl. No.: 10/225,897

(22) Filed: Aug. 22, 2002

(51) Int. Cl.[7] ............................. F02M 25/07; F01L 1/34
(52) U.S. Cl. ............................. 123/568.14; 123/90.15; 701/115
(58) Field of Search ..................... 123/90.11, 90.12, 123/90.15, 90.16, 90.17, 90.18, 295, 305, 478, 480, 486, 568.11, 568.13, 568.14; 701/103, 104, 106, 115; 73/117.3, 118.1; 706/15, 16, 23

(56) References Cited

U.S. PATENT DOCUMENTS

| | | | |
|---|---|---|---|
| 4,357,917 A | | 11/1982 | Aoyama |
| 4,378,003 A | | 3/1983 | Imamura |
| 4,700,684 A | | 10/1987 | Pischinger et al. |
| 5,161,497 A | | 11/1992 | Simko et al. |
| 5,209,194 A | * | 5/1993 | Adachi et al. ........... 123/90.17 |
| 5,222,465 A | * | 6/1993 | Sakamoto et al. ....... 123/90.15 |
| 5,857,437 A | | 1/1999 | Yoshioka |
| 6,092,017 A | * | 7/2000 | Ishida et al. ................. 701/106 |
| 6,158,403 A | * | 12/2000 | Berecewicz et al. ..... 123/90.11 |
| 6,196,173 B1 | * | 3/2001 | Takahashi et al. ........ 123/90.15 |
| 6,202,610 B1 | * | 3/2001 | Yoshiki et al. ........... 123/90.15 |
| 6,216,655 B1 | * | 4/2001 | Yoshiki et al. ........... 123/90.15 |
| 6,311,667 B1 | * | 11/2001 | Satou et al. ............. 123/90.15 |
| 6,405,694 B2 | * | 6/2002 | Sato ......................... 123/90.15 |
| 6,463,912 B1 | * | 10/2002 | Fuwa .......................... 123/480 |
| 6,510,835 B1 | * | 1/2003 | Mizuno et al. ............. 123/295 |
| 2001/0023671 A1 | * | 9/2001 | Vorih ....................... 123/90.12 |
| 2002/0010540 A1 | * | 1/2002 | Moriya et al. .............. 701/115 |

* cited by examiner

*Primary Examiner*—Willis R. Wolfe
(74) *Attorney, Agent, or Firm*—John E. Kajander

(57) ABSTRACT

A method for determining valve timing events to optimize operating parameters of an engine having a variable valve timing system over an entire operating range of the engine. The method includes setting combinations of intake valve opening and closing timing events and exhaust valve opening and closing timing events for a given engine speed. For each combination, a fuel conversion efficiency measure and an emissions measure of the engine at the given engine speed is obtained. Combinations which optimize a weighted cost function of the fuel conversion efficiency measure and the emission measure for a range of engine output torque settings at the given engine speed are then selected. This is repeated for each given engine speed across a range of engine speeds. A feed-forward map based on the selected combinations for the entire operating range of the engine is then assembled.

13 Claims, 3 Drawing Sheets

EVC, IVC Combinations
|  | 1000RPM | 2000RPM | 3000RPM |
|---|---|---|---|
| 120N-M | # | # | # |
| 130N-M | 450°, 475° | # | # |
| 140N-M | # | # | # |
← 99
FIG.6
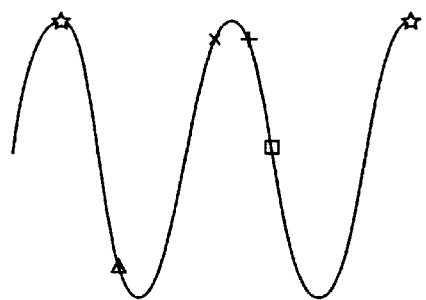
FIG.9A
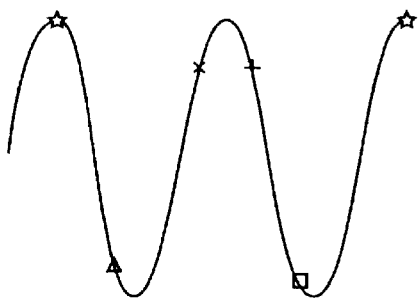
FIG.9B
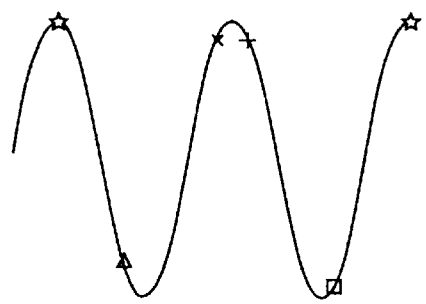
FIG.9C
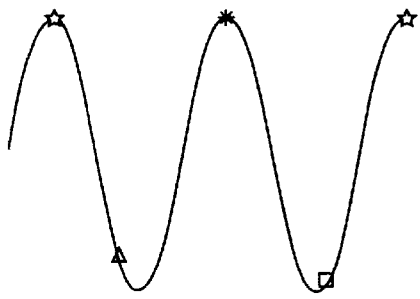
FIG.9D
☆ Top Center Combustion
△ Exhaust Valve Opening
✕ Exhaust Valve Closing
+ Intake Valve Opening
☐ Intake Valve Closing

METHOD OF DETERMINING VALVE EVENTS TO OPTIMIZE ENGINE OPERATING PARAMETERS

BACKGROUND OF THE INVENTION

1. Field of the Invention

The present invention relates to a method of determining valve events to optimize engine operating parameters for a given engine speed/load point.

2. Background Art

An engine equipped with a variable valve timing system has the potential to effectively manage exhaust gas re-circulation without the need for external equipment and to effectively control the cylinder charge, thus determining the operating point of the engine. Variable valve timing systems provide an opportunity to select the best valve timing events for a desired engine operating condition. However, given a variable valve event timing system capable of this flexibility, a valve timing event control method providing a comprehensive valve timing event strategy is necessary for these potentials to be realized.

Such a desired comprehensive valve timing event strategy would control the aspiration of the engine without the need for external gas re-circulation or throttling while providing the highest level of exhaust gas residual reasonable for a desired engine operating condition, minimizing $NO_x$ formation, and maximizing fuel economy. In essence, the desired comprehensive valve timing event strategy would manage internal exhaust gas re-circulation and cylinder air charge for an engine equipped with a variable valve timing event system.

In general, the valve timing event control method providing the desired comprehensive valve timing event strategy would implement real time valve timing event control as a mechanism for managing cylinder charge, thereby eliminating the need for a conventional throttle body which is a source of considerable pumping losses. Thus, given an engine without a throttle, a camshaft drive mechanism, and an external exhaust gas re-circulation equipment, the desired comprehensive valve timing event strategy would ideally optimize fuel economy; minimize emissions; not preclude implementation of other advanced control strategies; be conductive to continuous, transient engine control; be generic enough to be easily applied to any naturally aspirated four stroke engine; and make physical sense.

SUMMARY OF THE INVENTION

Accordingly, it is an object of the present invention to provide a method for determining valve events to optimize engine operating parameters for a given engine speed/load point.

In carrying out the above objects and other objects, the present invention provides a method for determining valve timing events to optimize operating parameters of an engine having a variable valve timing system over an entire operating range of the engine. The method includes the steps of (A) setting combinations of intake valve opening and closing timing events and exhaust valve opening and closing timing events for a given engine speed; (B) for each combination, obtaining a fuel conversion efficiency measure and an emissions measure of the engine at the given engine speed; (C) selecting combinations which optimize a weighted cost function of the fuel conversion efficiency measure and the emission measure for a range of engine output torque settings at the given engine speed; (D) repeating steps A, B, and C for each given engine speed across a range of engine speeds; and (E) assembling a feed-forward map based on the selected combinations for the entire operating range of the engine.

The optimization algorithm employed by the method generally includes the following steps. First, at each engine speed, the intake valve opening and closing timing events (IVO, IVC) and the exhaust valve opening and closing timing events (EVO, EVC) are swept. The spark and fuel are adjusted to maintain the best mean engine torque output (i.e., engine load) and the desired air-fuel ratio at each valve setting. The next step is that at each engine speed/load point, the valve timing events are selected from all possible valve timing event combinations which minimize a cost function of fuel consumption and emissions. From a local optimization perspective, one approach is to choose the minimum $NO_x$ (i.e., emissions) production allowable without degradation of combustion stability, sacrificing some degradation in fuel conversion efficiency. Globally, a later trade-off may be made between emissions and fuel economy and a cycle basis.

Unfortunately, accurate $NO_x$ formulation from simulation is difficult as is predicting combustion stability. So instead, in simulation, burnt exhaust gas residual is used as an indicator of $NO_x$ (cylinder temperature could be used alternatively). In the laboratory, a $NO_x$ measurement and an indicator of combustion stability, such as covariance of indicated mean effective pressure, could be used to refine the optimization.

The next step is to determine the valve timing events to obtain the desired engine load and the desired exhaust gas residual. It is desirable and sometimes necessary to have high exhaust gas residual at low engine loads (for desirable $NO_x$ emissions), low exhaust gas residual (for good performance), and a smooth transition in between. It is also desirable to have minimal exhaust gas residual at engine idling for proper combustion stability.

BRIEF DESCRIPTION OF THE DRAWINGS

FIG. 6 illustrates a feed-forward table of EVC and IVC timing events for engine speed/load points across the operating range of the engine in which the engine has a first set of operating parameters;

FIGS. 9A, 9B, 9C, and 9D illustrate timing sequences for EVO, EVC, IVO, and IVC timing events in accordance with the method of the present invention.

DETAILED DESCRIPTION OF THE PREFERRED EMBODIMENT(S)

Figure 1:
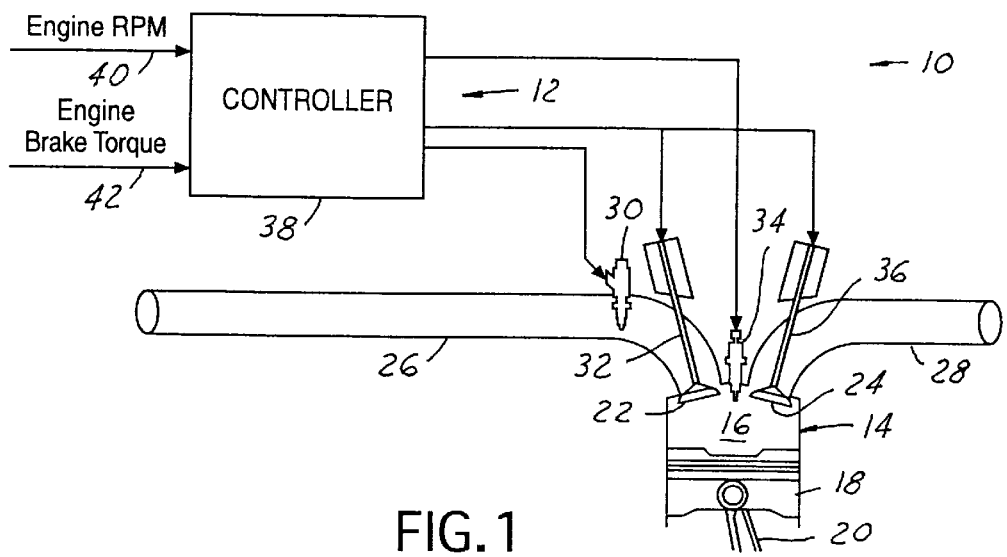
FIG. 1 illustrates an exemplary internal combustion engine having a variable valve timing event system for variably controlling valve timing events in accordance with the method of the present invention.

Referring now to FIG. 1, an exemplary internal combustion engine 10 having a variable valve timing event system 12 for variably controlling valve timing events in accordance with the method of the present invention is shown. Engine 10 includes a cylinder block having at least one cylinder 14. Cylinder 14 includes a combustion chamber 16 which houses a movable piston 18. A connecting rod 20 connects piston 18 to a crankshaft (not shown). Piston 18 moves up and down within combustion chamber 16 to move connecting rod 20 up and down in order to rotate the crankshaft and, consequently, power the vehicle having engine 10.

Combustion chamber 16 includes an intake port 22 and an exhaust port 24. An intake runner 26 is connected to intake port 22. An exhaust runner 28 is connected to exhaust port 24. Intake runner 26 introduces an air/fuel mixture into combustion chamber 16 through intake port 22. (In a direct fuel injection system, the fuel is injected directly into combustion chamber 16 and intake runner 26 introduces air into the combustion chamber.) Exhaust runner 28 discharges an exhaust gas of the combusted air/fuel mixture in combustion chamber 16 from exhaust port 24.

During operation of engine 10, air enters intake runner 26. A fuel injector 30 injects fuel into intake runner 26 (or directly into combustion chamber 16 if the fuel injector is part of a direct fuel injection system). The injected fuel mixes with the air in intake runner 26 to form an air/fuel mixture. An intake valve 32 moves from a closed position to an opened position with respect to intake port 22 to enable the air/fuel mixture to be drawn into combustion chamber 16. Intake valve 32 then moves to its closed position with respect to intake port 22 to seal off combustion chamber 16.

Piston 18 then moves up within combustion chamber 16 to compress the air/fuel mixture in the combustion chamber. A spark plug 34 then provides a spark within combustion chamber 16 to ignite the compressed air/fuel mixture. The compressed air/fuel mixture then combusts to produce power which causes piston 18 to move downward.

An exhaust valve 36 then moves from a closed position to an opened position with respect to exhaust port 24 to discharge at least a portion of the combusted air/fuel mixture (i.e., exhaust gas) into exhaust runner 28. Exhaust valve 36 then moves back to its closed position with respect to exhaust port 24 to seal off combustion chamber 16 and the cycle repeats.

Variable valve timing event system 12 includes a controller (power train module) 38. Based on desired engine condition inputs, controller 38 controls the air/fuel mixture injected into combustion chamber 16, the ignition timing of spark plug 34, and the opening and closing valve timing events of intake valve 32 and exhaust valve 36. The desired engine condition inputs include at least an engine speed or RPM (revolutions per minute) input 40 and an engine brake torque (i.e., engine load) input 42. Engine speed input 40 indicates a desired speed of engine 10 during operation. Engine brake torque input 42 indicates a desired load provided by engine 10 during operation.

In accordance with the method of the present invention, controller 38 controls the opening and closing valve timing events of intake valve 32 and exhaust valve 36 to optimize parameters of engine 10 for a desired engine speed and a desired engine load, i.e., a desired engine speed/load point. Controller 38 uses the method of the present invention to control the valve timing events in order to provide a comprehensive valve timing event strategy which manages the cylinder air charge and the exhaust gas mass residual in combustion chamber 16 for each engine cycle to obtain optimal operating parameters of engine 10 for a desired engine speed/load point.

An infinite number of valve timing event combinations of intake valve 32 and exhaust valve 36 exist for a given engine speed/load point. As such, the method of the present invention provides a continuous and transient variation of the valve timing events across different engine speed/load points such that the method physically accommodates the mechanical response limitations of the elements of engine 10. The optimal engine parameters generally include maximal fuel conversion efficiency and minimal emissions (i.e., minimal $NO_x$ formation) of engine 10 for a desired engine speed/load point. Typically, such optimal engine parameters occur when the highest level of residual gas (i.e., exhaust gas) is retained in combustion chamber 16 for the next cycle. This is because the presence of inert gas such as retained exhaust gas in combustion chamber 16 reduces the peak temperature during combustion, and hence retards the formation of $NO_x$ particles. However, there is an upper limit of retained exhaust gas, dictated by combustion stability that begins to deteriorate in the presence of excessive exhaust gas. Thus, it is generally beneficial to have the most retained exhaust gas reasonable, without endangering combustion stability.

As such, controller 38 uses the method of the present invention to provide real-time valve timing event control in order to control cylinder air charge and exhaust gas residual. The method contains two general parts which function together in order to manage the cylinder air charge and the exhaust gas residual. First, the method provides times for closing intake valve 32 and exhaust valve 36 in order to trap a desired amount of exhaust gas residual in combustion chamber 16 for the next combustion stroke. Second, the method provides a time for closing intake valve 32 to enable enough time for a desired amount of fresh air/fuel (or just fresh air if direct injection engine) to be introduced into combustion chamber 16.

That is, the method of the present invention is based on two principles. One, selecting an early closing timing event for exhaust valve 36 before top dead center thereby trapping residual gas in combustion chamber to control exhaust gas residual. Two, selecting a closing timing event for intake valve 32 to control cylinder air charge. The method may select fixed times for intake valve 32 opening (IV) and exhaust valve 36 opening (EVO) such that only two valve timing events (i.e., the two valve timing events for exhaust valve closing (EVC) and intake valve closing (IVC)) are selected for a given engine speed/load point.

The method selects an IVO timing event to take place approximately opposite the EVC timing event with respect to top dead center (TDC). This is because a mass of exhaust gas is trapped in combustion chamber 16 due to early EVC, and unnecessarily pumping gas through a valve orifice creates pumping losses. As a result, it makes physical sense to select an IVO timing event that is opposite the EVC timing event. This reflection of IVO and EVC timing events about TDC is referred to as an "EVC/IVO mirror."

As an example, if the EVC timing event is 20° before TDC then the IVO timing event should be 20° after TDC because it is at this point in the cycle that the cylinder pressure at EVC and IVO will be approximately equal, and minimal gas exchange will occur. However, it may be more beneficial to have some amount of blowback from combustion chamber 16 into intake runner 26 to promote fuel vaporization and mixing. In the instance, the IVO timing event is fixed to be slightly earlier. As such, this leaves the IVC timing event as the main mechanism for limiting air charge.

For a given engine speed, the method of the present invention may select a fixed EVO timing event as the EVO timing event is a function of engine speed (and to a lesser extent, engine load) and, as such, can be chosen independent of the other valve timing events (EVC, IVC, and IVO). Thus, the method fixes the EVO timing event to provide the best EVO timing event for each engine speed.

For a given engine speed/load point, there are an infinite number of possible EVC and IVC timing events. Taking into the considerations mentioned above regarding exhaust gas residual, the method selects appropriate EVC and IVC timing events which yield a continuous valve event surface across an array of engine speed/load points and which generally provide high fuel conversion efficiency and minimal undesired emissions.

In order to provide optimal engine parameters for a given engine speed/load point, the method chooses appropriate EVC and IVC timing events from an EVC and IVC feed-forward table. EVC and IVC feed-forward tables are assembled from EVC and IVC data maps in accordance with the present invention as explained below.

FIGS. 2, 3, 4, and 5 illustrate such EVC and IVC data maps for assembling an EVC and IVC feed-forward table. FIGS. 2, 3, 4, and 5 respectively illustrate EVC and IVC data maps 60, 70, 80, and 90. Each data map 60, 70, 80, and 90 includes contour lines which are plotted at a given engine speed such as 1000 rpms. In each of data maps 60, 70, 80, and 90, the x-axis is the IVC timing event measured in crank angle (CA) degrees after TDC and the y-axis is the EVC timing event (i.e., EVC/IVO mirrored timing event) measured in crank angle degrees after TDC.

Figure 2:
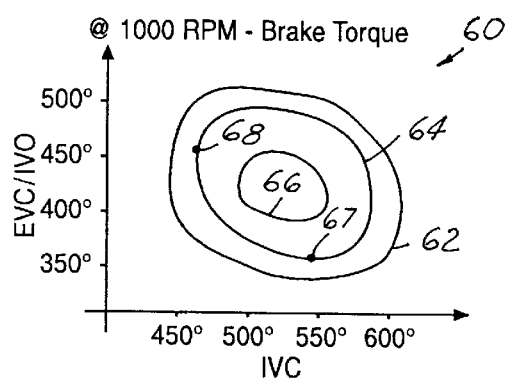
FIG. 2 illustrates a data map plotting contour lines of engine brake torque versus EVC and IVC timing events at a given engine speed.

Data map 60 illustrated in FIG. 2 illustrates the brake torque of engine 10 produced by EVC and IVC timing event combinations at the given engine speed. Data map 60 includes three brake torque contour lines 62, 64, and 66. Brake torque contour lines 62, 64, and 66 represent EVC and IVC timing event combinations which respectively produce 120 N-m, 130 N-m, and 140 N-m of brake torque. Data map 60 includes more brake torque contour lines (not shown) for other brake torque values. On brake contour line 64, point 67 represents the EVC and IVC combination of 400°, 550° which produces 130 N-m of brake torque at the given engine speed. Similarly, on brake contour line 64, point 68 represents the EVC and IVC combination of 450°, 475° which produces 130 N-m of brake torque at the given engine speed.

Figure 3:
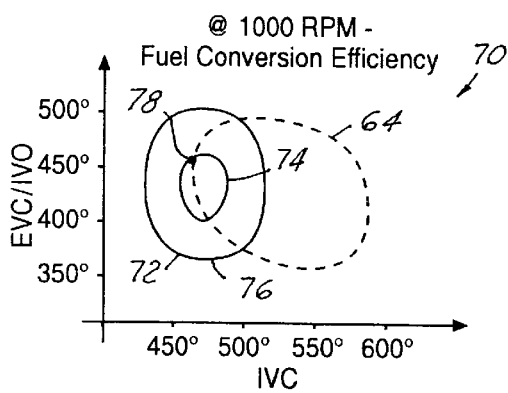
FIG. 3 illustrates a data map plotting contour lines of engine fuel conversion efficiency versus EVC and IVC timing events at the given engine speed.

Data map 70 illustrated in FIG. 3 illustrates the fuel conversion efficiency of engine 10 produced by EVC and IVC timing event combinations at the given engine speed. Data map 70 includes two fuel conversion efficiency contour lines 72 and 74. Fuel conversion efficiency contour lines 72 and 74 represent EVC and IVC timing event combinations which respectively produce 25% and 30% fuel conversion efficiency. Data map 70 includes more fuel conversion efficiency contour lines (not shown) for other fuel conversion efficiency values.

On fuel conversion efficiency contour line 72, point 76 represents the EVC and IVC combination of 350°, 500° which produces 25% fuel conversion efficiency at the given engine speed. Similarly, on fuel conversion efficiency contour line 74, point 78 represents the EVC and IVC combination of 450°, 475° which produces a fuel conversion efficiency of 30% at the given engine speed.

Brake torque contour line 64 is plotted in a dotted line on data map 70. As can be seen on data map 70, point 78 intersects brake contour line 64 and fuel conversion efficiency contour line 74. As such, point 78 represents the EVC and IVC combination of 450°, 475° which produces a brake torque of 130 N-m and a fuel conversion efficiency of 30% at the given engine speed.

Figure 4:
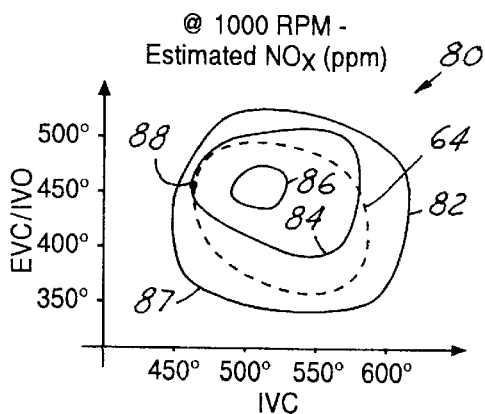
FIG. 4 illustrates a data map plotting contour lines of engine $NO_x$ formation versus EVC and IVC timing events at the given engine speed.

Data map 80 illustrated in FIG. 4 illustrates the estimated $NO_x$ formation in particles per minute (ppm) of engine 10 produced by EVC and IVC timing event combinations at the given engine speed. Data map 80 includes three $NO_x$ contour lines 82, 84, and 86. $NO_x$ formation contour lines 82 and 84 represent EVC and IVC timing event combinations which respectively produce 2000 ppm, 2427 ppm, and 3000 rpm. Data map 80 includes more $NO_x$ formation contour lines (not shown) for other $NO_x$ formation rates.

On $NO_x$ formation contour line 82, point 87 represents the EVC and IVC combination of 350°, 500° which produces 2000 ppm at the given engine speed. Similarly, on $NO_x$ formation contour line 84, point 88 represents the EVC and IVC combination of 450°, 475° which produces 2427 ppm at the given engine speed.

Brake torque contour line 64 is plotted in a dotted line on data map 80. As can be seen on data map 80, point 88 intersects brake contour line 64 and $NO_x$ formation contour line 84. As such, point 88 represents the EVC and IVC combination of 450°, 475° which produces a brake torque of 130 N-m and an estimated $NO_x$ formation of 2427 ppm at the given speed. As point 88 represents the same EVC and IVC combination as point 78 in data map 70, the fuel conversion efficiency is 30%. Thus, selecting an EVC and IVC combination of 450°, 475° for engine 10 produces a brake torque of 130 N-m at the given engine speed with the operating parameters of the engine including a fuel conversion efficiency of 30% and an estimated $NO_x$ formation of 2427 ppm.

Figure 5:
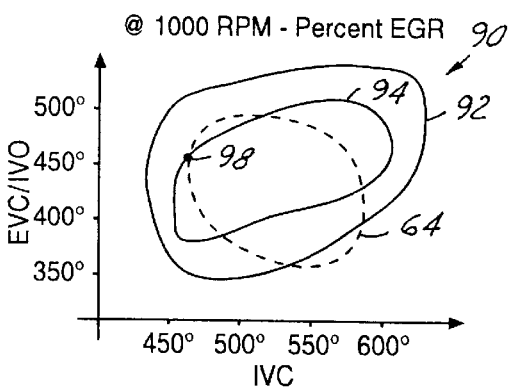
FIG. 5 illustrates a data map plotting contour lines of engine exhaust gas re-circulation versus EVC and IVC timing events at the given engine speed.

Data map 90 illustrated in FIG. 5 illustrates the percent exhaust gas re-circulation (EGR) of engine 10 produced by EVC and IVC timing event combinations at the given engine speed. Data map 90 includes two EGR contour lines 92 and 94. EGR contour lines 92 and 94 represent EVC and IVC timing event combinations which respectively produce 10% and 15% EGR. Data map 90 includes more EGR contour lines (not shown) for other percent EGR values.

On EGR contour line 94, point 98 represents the EVC and IVC combination of 450°, 475° which produces a 15% EGR at the given engine speed. Brake torque contour line 64 is plotted in a dotted line on data map 90. As can be seen on data map 90, point 88 intersects brake contour line 64 and EGR contour line 94. As such, point 98 represents the EVC and IVC combination of 450°, 475° which produces a brake torque of 130 N-m and a 15% at the given speed. As point 98 represents the same EVC and IVC combination as point 78 in data map 70, the fuel conversion efficiency is 30%. Similarly, as point 98 represents the same EVC and IVC combination as point 88 in data map 80, the estimated $NO_x$ formation is 2427 ppm. Thus, selecting an EVC and IVC combination of 450°, 475° for engine 10 produces a brake torque of 130 N-m at the given engine speed with the operating parameters of the engine including a fuel conversion efficiency of 30%, an estimated $NO_x$ formation of 2427 ppm, and a 15% EGR.

Data maps 60, 70, 80, and 90 represent respective engine operating parameters for EVC and IVC timing event combinations at the given engine speed. Thus, each engine speed has an associated set of data maps. For instance, a second set of data maps are assembled for an engine speed of 2000 rpm, a third set of data maps are assembled for an engine speed of 3000 rpm, etc. At any given engine speed, the method of the present invention uses the corresponding feed-forward tables derived as explained below from the associated data maps to select the EVC and IVC timing events which produce a desired brake torque and optimal fuel conversion efficiency, $NO_x$ formation, and percent EGR.

FIG. 6 illustrates a feed-forward table 100 derived from data maps 60, 70, 80, and 90 for the given engine speed of 1000 rpm and associated data maps for other engine speeds such as 2000 rpm and 3000 rpm. Feed-forward table 100 lists EVC and IVC combinations for respective engine speed/load points in which the operating parameters of engine 10 include a fuel conversion efficiency of 30%, an estimated $NO_x$ formation of 2427 ppm, and a 15% EGR. For instance, the engine speed/load point of 130 N-m at 1000 rpm lists the EVC and IVC combination of 450°, 475° which produces these operating parameters of engine 10. Thus, if these engine operating parameters are desired for the engine speed/load point of 130 N-m and 1000 rpm, then the method of the present invention selects the EVC and IVC combination of 450°, 475° from feed-forward table 100.

Other feed-forward tables are derived from data maps 60, 70, 80, and 90 for the given engine speed of 1000 rpm and associated data maps for other engine speeds. These other feed-forward tables list EVC and IVC combinations for respective engine speed/load points for different operating parameters of engine 10. Thus, for a given engine speed/load point, the method of the present invention selects the appropriate EVC and IVC combination from the appropriate feed-forward table associated with desired engine operating parameters.

Figure 7:
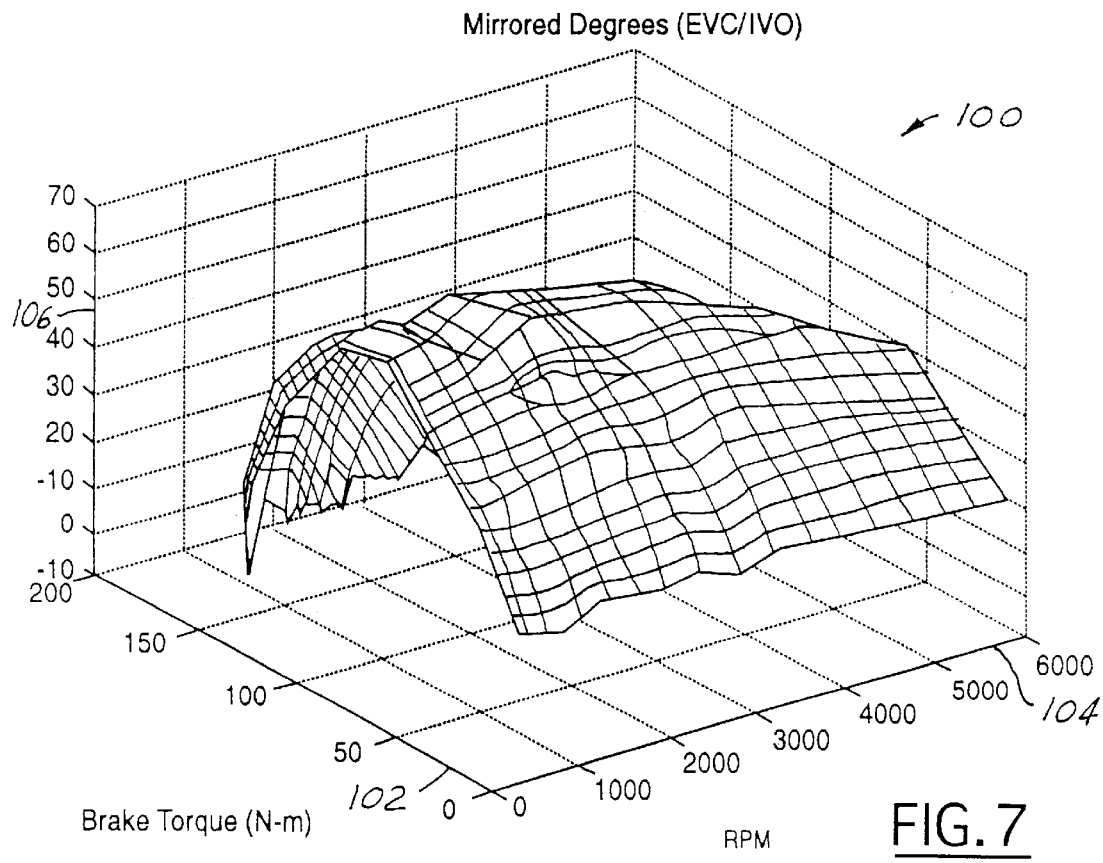
FIG. 7 illustrates a map plotting IVO and EVC mirrored timing events for each engine speed/load point in which the engine has a second set of operating parameters.
Figure 8:
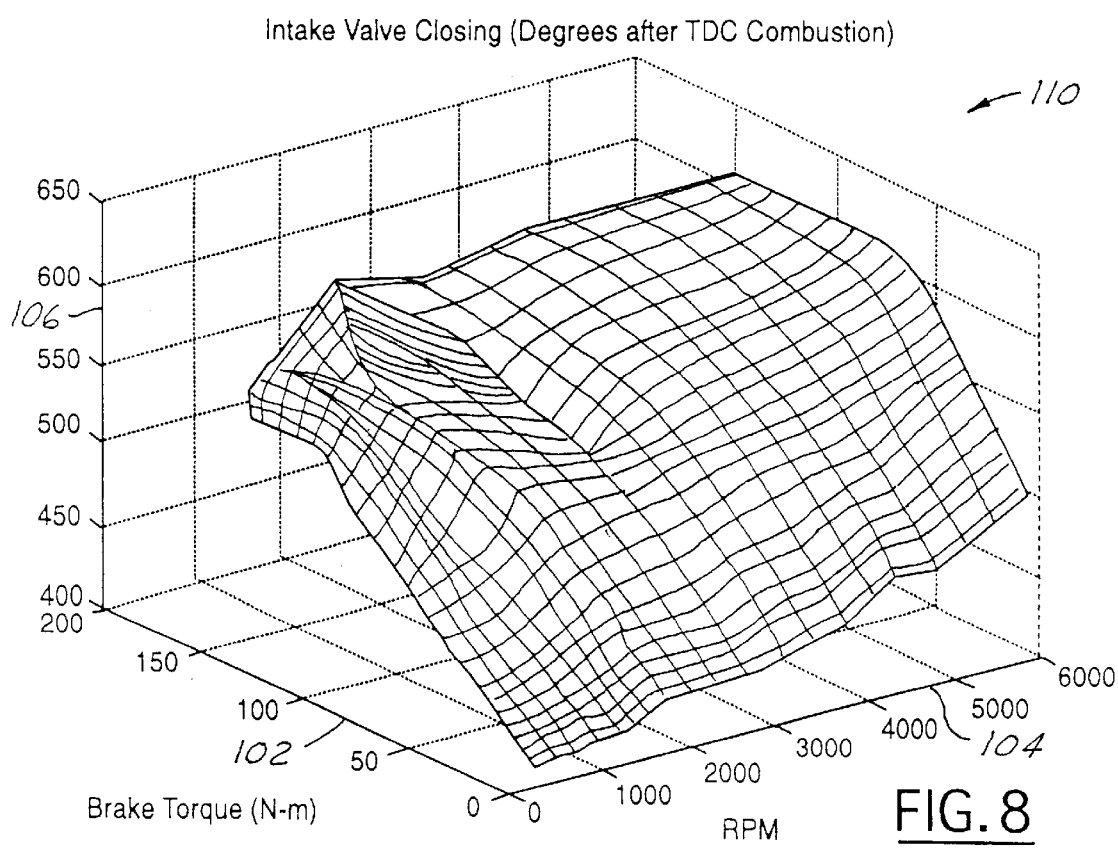
FIG. 8 illustrates a map plotting IVC timing events for each engine speed/load point in which the engine has the second set of operating parameters.

FIGS. 7 and 8 illustrate three-dimensional data maps which plot the EVC and IVC combinations for the data contained in a feed-forward table. FIG. 7 illustrates a data map 100 which plots mirrored EVC/IVO timing events for each engine speed/load point. As described above, the mirrored EVC/IVO timing event is a function of the EVC timing event as the IVO timing event is generally selected to mirror the EVC timing event. FIG. 8 illustrates a data map 110 which plots the IVC timing event for each engine speed/load point. In data maps 100 and 110, brake torque (i.e., engine load) is along x-axis 102 and engine speed is along y-axis 104. The mirrored EVC/IVO timing events and the IVC timing events are plotted along z-axis 106.

With reference to the contour lines contained in data maps 60, 70, 80, and 90, it is apparent that the engine operating parameters, i.e., fuel conversion efficiency, the $NO_x$ formulation, and the percent EGR, vary differently from one another between EVC and IVC timing event combinations. As such, for a given engine speed/load point, the method of the present invention may select the EVC and IVC timing event combination as a function of a weighting between the engine operating parameters. For instance, the method may select the EVC and IVC timing event combination from the feed-forward map associated with a relatively lesser fuel conversion efficiency but a relatively much greater reduction in the $NO_x$ formulation as a result of a higher percentage EGR for the given engine speed/load point.

Using the method of the present invention, for low and upper engine load conditions, controller 38 selects EVC event just prior to the top center of piston 18 thus trapping a mass of exhaust gas in combustion chamber 16. Piston 18 continues to move upward within cylinder 14 towards the top center and compresses the trapped exhaust gas. After reaching the top center, piston 18 moves downwardly within cylinder 14, subsequently decompressing the trapped exhaust gas and recovering the work originally done during compression. Controller 38 then selects IVO to allow the air/fuel mixture to enter combustion chamber 16. Controller 38 maintains intake valve 32 open long enough to draw in a desired fresh mass of air and fuel into combustion chamber 16 at which point the controller selects the IVC timing event. Piston 18 continues its motion until it is once again compressing the contents of combustion chamber 16 to produce combustion. Controller 38 then selects EVO timing event for the given engine speed and engine load with consideration given to optimizing the fuel conversion efficiency and minimizing undesired emissions. The cycle then repeats.

At high engine load conditions, at or near the maximum torque limits of engine 10 for a given engine speed, controller 38 selects EVC and IVO timing events to overlap near the top center of piston 18. Controller 38 overlaps these times to use the momentum of the fluid being expelled from cylinder 14 to assist in drawing the air/fuel mixture for combustion into the cylinder and further purging exhaust gas present in the cylinder which may become a limitation at high loads.

An embodiment of the timing strategy provided by the method of the present invention is to have controller 38 select EVC and IVO timing events to provide a desired or constant amount of exhaust gas mass residual at or near the maximum value (determined by combustion stability) over the low to mid load engine range. As the engine load increases, the timing strategy is selected such that the exhaust gas mass residual gradually tapers off. The exhaust gas mass residual is tapered off because of the limited volume of cylinder 14. That is, to make room for more air/fuel mixture it is necessary to decrease the amount of exhaust gas.

FIGS. 9A, 9B, 9C, and 9D illustrate EVO, EVC, IVO, and IVC timing event sequences selected by controller 38 using the method of the present invention. FIG. 9A illustrates the valve event timing sequence for low engine loads. FIG. 9B illustrates the valve event timing sequence for mid-range engine loads. FIG. 9C illustrates the valve event timing sequence for high engine loads. FIG. 9D illustrates the valve event timing sequence for maximum engine loads.

In general, the valve event timing sequences illustrated in FIGS. 9A, 9B, 9C, and 9D represent how the valve events vary at a given engine speed as a function of engine load. At low engine load conditions (FIG. 9A) there is less total mass trapped in cylinder 14. Thus, controller 38 selects IVC at a mid-range value after the top center of the piston stroke, selects EVC just prior to top center, and selects IVO just after top center.

As the engine load increases (FIG. 9B) the desired amount of exhaust gas retained in cylinder 14 increases so controller 38 selects EVC and IVO to move farther away from top center. Controller 38 also selects IVC relatively later to allow the induction of more fresh air/fuel charge into cylinder 14.

When the engine load reaches a higher range (FIG. 9C) controller 38 selects IVC at a time even later with respect to FIG. 9B to maximize the amount of gas trapped in cylinder 14. Likewise, controller 38 selects EVC and IVO back towards top center to reduce the amount of residual exhaust gas and make room for more fresh air/fuel mixture.

Finally, at the maximum engine load (FIG. 9D) controller 38 selects IVC at the same time with respect to FIG. 9C. Controller 38 selects EVC and IVO further towards the top center such that these events slightly overlap to allow for the small amount of blow available, thus reducing the amount of the residual gas trapped as much as possible and consequently maximizing the fresh air/fuel charge.

Of course, as described above, controller 38 may select EVO and IVO events at fixed times while varying EVC and IVC events. In this way, controller 38 removes two degrees of freedom in order to simply control.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining valve timing events to optimize operating parameters of an engine having a variable valve timing system over an entire operating range of the engine, the method comprising the steps of:
   (A) setting combinations of intake valve opening and closing timing events and exhaust valve opening and closing timing events for a given engine speed;
   (B) for each combination, obtaining a fuel conversion efficiency measure and an emissions measure of the engine at the given engine speed;
   (C) selecting combinations which optimize a weighted cost function of the fuel conversion efficiency measure and the emission measure for a range of engine output torque settings at the given engine speed;
   (D) repeating steps A, B, and C for each given engine speed across a range of engine speeds; and
   (E) assembling a feed-forward map based on the selected combinations for the entire operating range of the engine.

2. The method of claim 1 wherein:
   the fuel conversion efficiency measure includes a fuel consumption measure.

3. The method of claim 1 wherein:
   the emissions measure includes an estimated $NO_x$ measure.

4. The method of claim 1 wherein:
   the emissions measure includes an internal exhaust gas re-circulation measure.

5. The method of claim 1 further comprising:
   controlling the engine in accordance with the selected combination for an engine output torque setting at a given engine speed.

6. A method for determining valve timing events to optimize operating parameters of an engine having a variable valve timing system over an entire operating range of the engine, the method comprising the steps of:
   (A) setting combinations of intake valve and exhaust valve closing timing events for a given engine speed;
   (B) for each combination, obtaining a fuel conversion efficiency measure and an emissions measure of the engine at the given engine speed;
   (C) selecting combinations which optimize a weighted cost function of the fuel conversion efficiency measure and the emission measure for a range of engine output torque settings at the given engine speed;
   (D) repeating steps A, B, and C for each given engine speed across a range of engine speeds; and
   (E) assembling a feed-forward map based on the selected combinations for the entire operating range of the engine.

7. The method of claim 6 further comprising:
   setting exhaust valve opening timing events as a function of engine speed.

8. The method of claim 6 further comprising:
   setting intake valve opening timing events as a function of exhaust valve closing timing events.

9. The method of claim 6 further comprising:
   controlling the engine in accordance with the selected combination for an engine output torque setting at a given engine speed.

10. A method for determining valve timing events to optimize operating parameters of an engine having a variable valve timing system over an entire operating range of the engine, the method comprising the steps of:
    (A) setting combinations of intake valve and exhaust valve closing timing events for a given engine speed;
    (B) for each combination, obtaining an exhaust gas residual measurement and an air charge measurement of the engine at the given engine speed;
    (C) selecting combinations which optimize a weighted cost function of the exhaust gas residual measurement and the air charge measurement for a range of engine output torque settings at the given engine speed;
    (D) repeating steps A, B, and C for each given engine speed across a range of engine speeds; and
    (E) assembling a feed-forward map based on the selected combinations for the entire operating range of the engine.

11. The method of claim 10 further comprising:
    setting exhaust valve opening timing events as a function of engine speed.

12. The method of claim 10 further comprising:
    setting intake valve opening timing events as a function of exhaust valve closing timing events.

13. The method of claim 10 further comprising:
    controlling the engine in accordance with the selected combination for an engine output torque setting at a given engine speed.

* * * * *